US009119014B2

(12) United States Patent
Gercekci et al.

(10) Patent No.: US 9,119,014 B2
(45) Date of Patent: *Aug. 25, 2015

(54) METHOD AND APPARATUS FOR SUPPORTING WIRELESS COMMUNICATION IN A VEHICLE

(71) Applicant: Marvell World Trade LTD., St. Michael (BB)

(72) Inventors: Anil Gercekci, Bellevue (CH); Avinash Ghirnikar, Saratoga, CA (US)

(73) Assignee: Marvell World Trade LTD., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 14/101,627

(22) Filed: Dec. 10, 2013

(65) Prior Publication Data

US 2014/0098806 A1    Apr. 10, 2014

Related U.S. Application Data

(63) Continuation of application No. 13/175,586, filed on Jul. 1, 2011, now Pat. No. 8,605,696, which is a continuation of application No. 11/868,649, filed on Oct. 8, 2007, now Pat. No. 7,974,251.

(60) Provisional application No. 60/829,076, filed on Oct. 11, 2006.

(51) Int. Cl.
*H04W 4/00* (2009.01)
*H04L 29/08* (2006.01)
(Continued)

(52) U.S. Cl.
CPC ............. *H04W 4/00* (2013.01); *H04L 12/66* (2013.01); *H04L 67/12* (2013.01); *H04W 88/02* (2013.01)

(58) Field of Classification Search
CPC ......... H04W 4/00; H04W 88/02; H04L 12/66
See application file for complete search history.

(56) References Cited

U.S. PATENT DOCUMENTS 6,995,687 B2 *   2/2006   Lang et al. ................. 340/932.2
2002/0110146 A1 *   8/2002   Thayer et al. ................. 370/465
(Continued)

FOREIGN PATENT DOCUMENTS

EP          1653663 A1    5/2006
WO   WO-00072463 A2   11/2000
(Continued)

OTHER PUBLICATIONS

The International Search Report and the Written Opinion of the International Searching Authority, or the Declaration dated Jun. 4, 2008 for International Application No. PCT/US2007/021400 filed Oct. 8, 2007; 17 Pages.

(Continued)

*Primary Examiner* — Min Jung (57) ABSTRACT

A system, for a vehicle, including a first wireless client station implemented in the vehicle, a wireless access point implemented in the vehicle, and a controller implemented in the vehicle. The first wireless client station is configured to transmit a first packet. The first packet includes a first command to control an operation of the vehicle. The wireless access point is configured to receive the first packet and transmit the first packet. The controller is configured to receive the first packet from the wireless access point and to control the operation of the vehicle in accordance with the first command included within the first packet.

16 Claims, 5 Drawing Sheets

(51) Int. Cl.
*H04L 12/66* (2006.01)
*H04W 88/02* (2009.01)

(56) References Cited

U.S. PATENT DOCUMENTS

| | | | |
|---|---|---|---|
| 2003/0093798 | A1 | 5/2003 | Rogerson |
| 2004/0049343 | A1* | 3/2004 | Yamadaji et al. ............. 701/301 |
| 2004/0203379 | A1* | 10/2004 | Witkowski et al. .......... 455/41.2 |
| 2005/0039208 | A1 | 2/2005 | Veeck et al. |
| 2005/0195783 | A1 | 9/2005 | Basir |
| 2005/0245272 | A1 | 11/2005 | Spaur et al. |
| 2006/0036356 | A1 | 2/2006 | Rasin et al. |
| 2006/0061459 | A1* | 3/2006 | Kawamura et al. ...... 340/426.36 |
| 2006/0211446 | A1 | 9/2006 | Wittmann et al. |
| 2006/0220814 | A1 | 10/2006 | Kawashima |
| 2006/0224305 | A1 | 10/2006 | Ansari et al. |
| 2006/0229777 | A1* | 10/2006 | Hudson et al. .................. 701/29 |
| 2007/0078574 | A1 | 4/2007 | Davenport |
| 2007/0124063 | A1* | 5/2007 | Kindo ........................... 701/208 |
| 2007/0125184 | A1 | 6/2007 | Maguire et al. |
| 2007/0140187 | A1 | 6/2007 | Rokusek et al. |
| 2007/0149247 | A1 | 6/2007 | Wong |
| 2007/0294033 | A1 | 12/2007 | Osentoski et al. |
| 2009/0228908 | A1 | 9/2009 | Margis et al. |
| 2010/0120366 | A1 | 5/2010 | DeBiasio et al. |

FOREIGN PATENT DOCUMENTS

| | | | |
|---|---|---|---|
| WO | WO-2005000437 | A2 | 1/2005 |
| WO | WO-2005125207 | A2 | 12/2005 |

OTHER PUBLICATIONS

IEEE Std 802.11b-1999/Cor Jan. 2001 (Corrigendum to IEEE Std 802.11b-1999); IEEE Standard for Information technology—Telecommunications and information exchange between systens—Local and metropolitan area networks—Specific requirements—Part 11: Wireless LAN Medium Access Control (MAC) and Physical Layer (PHY) specifications Amendment 2: Higher-Speed Physical Layer (PHY) extension in the 2.4 GHz Band-Corrigendum 1; LAN/MAN Standards Committee of the IEEE Computer Society; Nov. 7, 2001; 23 Pages.

IEEE Std 802.11g/D8.2, Apr. 2003 (Supplement to ANS/IEEE Std 802.11-1999 (Reaff 2003); DRAFT Supplement to Standard [for] Information Technology—Telecommunications and information exchange between systems—Local and metropolitan area networks—Speciic requirements—Part 11: Wirless LAN Medium Access Control (MAC) and Physical Layer (PHY) specifications: Further Higher Data Rate Extension in the 2.4 GHz Band; LAN/MAN Standards Committee of the IEEE Computer Society; 69 Pages.

IEEE 802.11n; IEEE 802.11-04/0889r6; IEEE P802.11 Wireless LANs; TGn Sync Proposal Technical Specification; May 2005; 131 Pages.

IEEE Std 802.11a-1999 (Supplement to IEEE Std 802.11-1999); Supplement to IEEE Standard for Information technology—Telecommunications and information exchange between systems—Local and metropolitan area networks—Speciic requirements—Part 11: Wireless LAN Medium Access Control (MAC) and Physical Layer (PHY) specifications: High-speed Physical Layer (PHY) in the 5 GHz Band; LAN/MAN Standards Committee of the IEEE Computer Society; Sep. 16, 1999; 91 Pages.

IEEE Std 802.11e/D11.0, Oct. 2004 (Amendment to ANS/IEEE Std 802.11-1999 (2003 Reaff) edition as amended by IEEE Std 802.11g-2003, IEEE Std 802.11h-2003 and IEEE 802.11-2004); IEEE Standard for Information Technology—Telecommunications and information exchange between systems—Loval and metropolitan area networks—Speciic requirements—Part 11: Wirless LAN Medium Access Control (MAC) and Physical Layer (PHY) specifications: Amendment 7: Medium Access Control (MAC) Quality of Service (OoS) Enhancements; LAN/MAN Committee of the IEEE Computer Society; 195 Pages.

IEEE Std 802.11iTM-2004 (Amendment to IEEE Std 802.11, 1999 Edition (Reaff 2003) as amended by IEEE Stds 802.11aTM-1999, 802.11bTM-1999, 802.11bTM-1999/Cor Jan. 2001, 802.11gTM-2003, and 802.11hTM-2003); IEEE Standards for Information Technology—Telecommunications and information exchange between systems—Loval and metropolitan area networks—Speciic requirements—Part 11: Wireless LAN Medium Access Control (MAC) Security Enhancements; IEEE Comupter Society; LAN/MAN Standards Committee; Jul. 23, 2004; 190 Pages.

* cited by examiner

METHOD AND APPARATUS FOR SUPPORTING WIRELESS COMMUNICATION IN A VEHICLE

CROSS-REFERENCE TO RELATED APPLICATIONS

This present disclosure is a continuation of U.S. application Ser. No. 13/175,586 (now U.S. Pat. No. 8,605,696) filed Jul. 1, 2011 which is a continuation of U.S. application Ser. No. 11/868,649 (now U.S. Pat. No. 7,974,251) filed on Oct. 8, 2007, which claims priority under 35 U.S.C. §119(e) to U.S. Provisional Application No. 60/829,076, filed on Oct. 11, 2006. The entire disclosures of the applications referenced above are incorporated herein by reference.

BACKGROUND

The present invention relates generally to digital data communications. More particularly, the present invention relates to wireless networks for vehicles.

Conventional signal distribution systems within automobiles use some kind of cable harness including electrical wires, optical fibers, and the like. For example, to realize media distribution systems in automobiles requires the installation of several meters (if not kilometers) of cable. This installation not only adds significant cost and weight to the automobile, but also restricts the placement of certain components, thereby reducing design options. Furthermore, conventional automotive media systems are limited to static media sources, such as tapes, CDs, DVDs, and the like.

SUMMARY

In general, in one aspect, the invention features a vehicle comprising: a media source to provide digital data; a first wireless network station comprising a first transmitter to wirelessly transmit first packets of the digital data; a second wireless network station comprising a first receiver to wirelessly receive the first packets of the digital data; and a media player to reproduce media based on the first packets of the digital data wirelessly received by the second wireless network station.

In some embodiments, the media comprises at least one of: audio; and video. In some embodiments, the first and second wireless network stations are compliant with all or part of IEEE standard 802.11, including draft and approved amendments 802.11a, 802.11b, 802.11e, 802.11g, 802.11i, 802.11k, 802.11n, 802.11v, and 802.11w. In some embodiments, the first wireless network station comprises a wireless access point; and wherein the second wireless network station comprises a wireless client. Some embodiments comprise an ultra-wideband local area network comprising the first and second wireless network stations. Some embodiments comprise a user interface; wherein the second network station comprises a second transmitter to wirelessly transmit second packets of data in response to operation of the user interface; wherein the first network station comprises a second receiver to receive the second packets of data; and wherein the media source, coupled to the first network station, provides the digital data based on the second packets of data wirelessly received by the second receiver. Some embodiments comprise a wide area network station to wirelessly exchange third packets of data with at least one network station outside the vehicle, wherein the wide area network station is in communication with the first wireless network station.

In general, in one aspect, the invention features a vehicle comprising: media source means for providing digital data; first wireless network means for communicating comprising first transmitter means for wirelessly transmitting first packets of the digital data; second wireless network means for communicating comprising first receiver means for wirelessly receiving the first packets of the digital data; and media player means for reproducing media based on the first packets of the digital data wirelessly received by the second wireless network means for communicating.

In some embodiments, the media comprises at least one of: audio; and video. In some embodiments, the first and second wireless network means for communicating are compliant with all or part of IEEE standard 802.11, including draft and approved amendments 802.11a, 802.11b, 802.11e, 802.11g, 802.11i, 802.11k, 802.11n, 802.11v, and 802.11w. Some embodiments comprise ultra-wideband local area network means for communicating comprising the first and second wireless network means for communicating. Some embodiments comprise means for interfacing with a user; wherein the second network means for communicating comprises second transmitter means for wirelessly transmitting second packets of data in response to operation of the means for interfacing; wherein the first network means for communicating comprises second receiver means for receiving the second packets of data; and wherein the media source means, coupled to the first network means for communicating, provides the digital data based on the second packets of data wirelessly received by the second receiver means. Some embodiments comprise wide area network means for wirelessly exchanging third packets of data with at least one network station outside the vehicle, wherein the wide area network means is in communication with the first wireless network means for communicating.

In general, in one aspect, the invention features a method comprising: providing digital data; wirelessly transmitting first packets of the digital data from a first transmitter of a first wireless network station in the vehicle; wirelessly receiving the first packets of the digital data at a first receiver of a second wireless network station in the vehicle; and reproducing media based on the first packets of the digital data wirelessly received by the second wireless network station.

In some embodiments, the media comprises at least one of: audio; and video. wherein the digital data is provided in a vehicle. In some embodiments, the first and second wireless network stations are compliant with all or part of IEEE standard 802.11, including draft and approved amendments 802.11a, 802.11b, 802.11e, 802.11g, 802.11i, 802.11k, 802.11n, 802.11v, and 802.11w. In some embodiments, the first wireless network station comprises a wireless access point; and wherein the second wireless network station comprises a wireless client. In some embodiments, an ultra-wideband local area network comprises the first and second wireless network stations. Some embodiments comprise wirelessly transmitting second packets of data from a second transmitter of the second network station in response to operation of a user interface in the vehicle; wirelessly receiving the second packets of data at a second receiver of the first network station; and wherein the digital data is provided based on the second packets of data wirelessly received by the second receiver. Some embodiments comprise wirelessly exchanging third packets of data with network stations outside the vehicle; and exchanging the third packets of data with the first wireless network station.

In general, in one aspect, the invention features a vehicle comprising: a first user interface; a first wireless network station comprising a first transmitter to wirelessly transmit first packets of data in response to operation of the first user interface; a second wireless network station comprising a first receiver to wirelessly receive the first packets of data; and a vehicle controller to control the vehicle in response to the first packets of data wirelessly received by the second wireless network station.

In some embodiments, the first and second wireless network stations are compliant with all or part of IEEE standard 802.11, including draft and approved amendments 802.11a, 802.11b, 802.11e, 802.11g, 802.11i, 802.11k, 802.11n, 802.11v, and 802.11w. In some embodiments, the first wireless network station comprises a wireless access point; and wherein the second wireless network station comprises a wireless client. Some embodiments comprise an ultra-wideband local area network comprising the first and second wireless network stations. Some embodiments comprise a vehicle sensor to collect sensor data describing a condition of the vehicle; a third network station comprising a second transmitter to wirelessly transmit second packets of the sensor data; and wherein the first network station comprises a second receiver to wirelessly receive the second packets of the sensor data. In some embodiments, the first user interface generates a display representing the sensor data wirelessly received by the second receiver. Some embodiments comprise a wide area network station to wirelessly exchange third packets of data with network stations outside the vehicle, wherein the wide area network station is in communication with the first wireless network station. Some embodiments comprise a media source to provide digital data; wherein the first transmitter wirelessly transmits second packets of the digital data; a third wireless network station comprising a second receiver to wirelessly receive the second packets of the digital data; and a media player to reproduce media based on the second packets of the digital data wirelessly received by the third wireless network station. In some embodiments, the media comprises at least one of: audio; and video. Some embodiments comprise a second user interface; wherein the third network station comprises a second transmitter to wirelessly transmit third packets of data in response to operation of the second user interface; wherein the first network station comprises a second receiver to wirelessly receive the third packets of data; and wherein the media source provides the digital data based on the third packets of data wirelessly received by the second receiver. In some embodiments, the media source is coupled to the second receiver.

In general, in one aspect, the invention features a vehicle comprising: first means for interfacing with a user; first wireless network means for communicating comprising first transmitter means for wirelessly transmitting first packets of data in response to operation of the first means for interfacing; second wireless network means for communicating comprising first receiver means for wirelessly receiving the first packets of data; and vehicle controller means for controlling the vehicle in response to the first packets of data wirelessly received by the second wireless network means for communicating.

In some embodiments, the first and second wireless network means for communicating are compliant with all or part of IEEE standard 802.11, including draft and approved amendments 802.11a, 802.11b, 802.11e, 802.11g, 802.11i, 802.11k, 802.11n, 802.11v, and 802.11w. Some embodiments comprise ultra-wideband local area network means for communicating comprising the first and second wireless network means for communicating. Some embodiments comprise vehicle sensor means for collecting sensor data describing a condition of the vehicle; third network means for communicating comprising second transmitter means for wirelessly transmitting second packets of the sensor data; and wherein the first network means for communicating comprises second receiver means for wirelessly receiving the second packets of the sensor data. In some embodiments, the first means for interfacing generates a display representing the sensor data wirelessly received by the second means for receiving. Some embodiments comprise wide area network means for wirelessly exchanging third packets of data with network stations outside the vehicle, wherein the wide area network means is in communication with the first wireless network means for communicating. Some embodiments comprise media source means for providing digital data; wherein the first means for transmitting wirelessly transmits second packets of the digital data; third wireless network means for communicating comprising second receiver means for wirelessly receiving the second packets of the digital data; and media player means for reproducing media based on the second packets of the digital data wirelessly received by the third wireless network means for communicating. In some embodiments, the media comprises at least one of: audio; and video. Some embodiments comprise second means for interfacing with a user; wherein the third network means for communicating comprises second transmitter means for wirelessly transmitting third packets of data in response to operation of the second means for interfacing; wherein the first network means for communicating comprises second receiver means for wirelessly receiving the third packets of data; and wherein the media source means provides the digital data based on the third packets of data wirelessly received by the second receiver means. In some embodiments, the media source means is coupled to the second receiver means.

In general, in one aspect, the invention features a method comprising: a first user interface; wirelessly transmitting first packets of data from a first transmitter of a first wireless network means for communicating in a vehicle in response to operation of a first user interface in the vehicle; wirelessly receive the first packets of data at a first receiver of a second wireless network means for communicating in the vehicle; and controlling the vehicle in response to the first packets of data wirelessly received by the second wireless network means for communicating.

In some embodiments, the first and second wireless network means for communicating are compliant with all or part of IEEE standard 802.11, including draft and approved amendments 802.11a, 802.11b, 802.11e, 802.11g, 802.11i, 802.11k, 802.11n, 802.11v, and 802.11w. In some embodiments, the first wireless network means for communicating comprises a wireless access point; and wherein the second wireless network means for communicating comprises a wireless client. In some embodiments, an ultra-wideband local area network comprises the first and second wireless network means for communicating. Some embodiments comprise collecting sensor data describing a condition of the vehicle; wirelessly transmitting second packets of the sensor data from a second transmitter of a third network means for communicating in the vehicle; and wirelessly receiving the second packets of the sensor data at a second receiver of the first network means for communicating. Some embodiments comprise generating a display representing the sensor data wirelessly received by the second receiver. Some embodiments comprise wirelessly exchanging third packets of data with network means for communicating outside the vehicle; and exchanging the third packets of data with the first wireless network means for communicating. Some embodiments comprise providing digital data; wirelessly transmitting second packets of the digital data from the first transmitter; wirelessly receiving the second packets of the digital data at a second receiver of a third wireless network means for communicating of the vehicle; and reproducing media based on the second packets of the digital data wirelessly received by the third wireless network means for communicating. In some embodiments, the media comprises at least one of: audio; and video. Some embodiments comprise wirelessly transmitting third packets of data from a second transmitter of the third network means for communicating in response to operation of a second user interface of the vehicle; wirelessly receiving the third packets of data at a second receiver of the first network means for communicating; and providing the digital data based on the third packets of data wirelessly received by the second receiver.

The details of one or more implementations are set forth in the accompanying drawings and the description below. Other features will be apparent from the description and drawings, and from the claims.

DESCRIPTION OF DRAWINGS

The leading digit(s) of each reference numeral used in this specification indicates the number of the drawing in which the reference numeral first appears.

DETAILED DESCRIPTION

As used herein, the terms "client" and "server" generally refer to an electronic device or mechanism, and the term "message" generally refers to an electronic signal representing a digital message. As used herein, the term "mechanism" refers to hardware, software, or any combination thereof. These terms are used to simplify the description that follows. The clients, servers, and mechanisms described herein can be implemented on any standard general-purpose computer, or can be implemented as specialized devices. Furthermore, while some embodiments of the present invention are described with reference to a client-server paradigm, other embodiments employ other paradigms, such as peer-to-peer paradigms and the like.

Embodiments of the present invention provide wireless networks for vehicles. The vehicles include, but are not limited to, automobiles and the like. In some embodiments, the wireless networks are used to distribute vehicle control and sensor signals. These embodiments include a user interface to allow a user to control and monitor the vehicle. The vehicle includes a wireless network including a first network station to wirelessly transmit packets of data in response to operation of the user interface, and one or more second wireless network stations to receive the packets. One or more second vehicle controllers control the vehicle according to the packets received by the second network stations. The vehicle controllers can include turn signals and lights, wiper controls, window and lock controls, radio controls, steering, brake and accelerator controls, and the like.

According to these embodiments, the vehicle can also include one or more vehicle sensors to collect sensor data describing a condition of the vehicle, such as speed, engine temperature, tire pressure, fuel level, lamp operation, and the like. The wireless network includes one or more third network stations each having a second transmitter to wirelessly transmit packets of the sensor data, which are received by the first station. The user interface can generate a display representing the sensor data.

In some embodiments, the wireless networks are used to distribute and control media such as audio and/or video and the like. In these embodiments, a media source provides digital data representing media such as audio, video, and the like. In some embodiments, the media source includes a digitizer to digitize analog media into the digital data. The wireless network includes a first wireless network station to wirelessly transmit packets of the digital data, and one or more second wireless network stations to wirelessly receive the packets. A media player reproduces the audio and/or video based on the packets of the digital data received by the second wireless network stations.

According to these embodiments, the vehicle can also include a user interface to enable a user to control the media. In response to operation of the user interface, the second network station wirelessly transmits second packets of data, which are received by the first wireless network station. The media source provides the digital data based on the second packets of data.

In various embodiments, the wireless network can be compliant with all or part of IEEE standard 802.11, including draft and approved amendments 802.11a, 802.11b, 802.11e, 802.11g, 802.11i, 802.11k, 802.11n, 802.11v, and 802.11w. In some embodiments, the first wireless network station can be implemented as a wireless access point, and the second wireless network stations can be implemented as wireless clients. In some embodiments, the wireless network is an ultra-wideband (UWB) local area network (LAN). Some embodiments comprise a wide area network (WAN) station to wirelessly exchange packets of data with network stations outside the vehicle. The WAN station is in communication with the first wireless network station.

Figure 1:
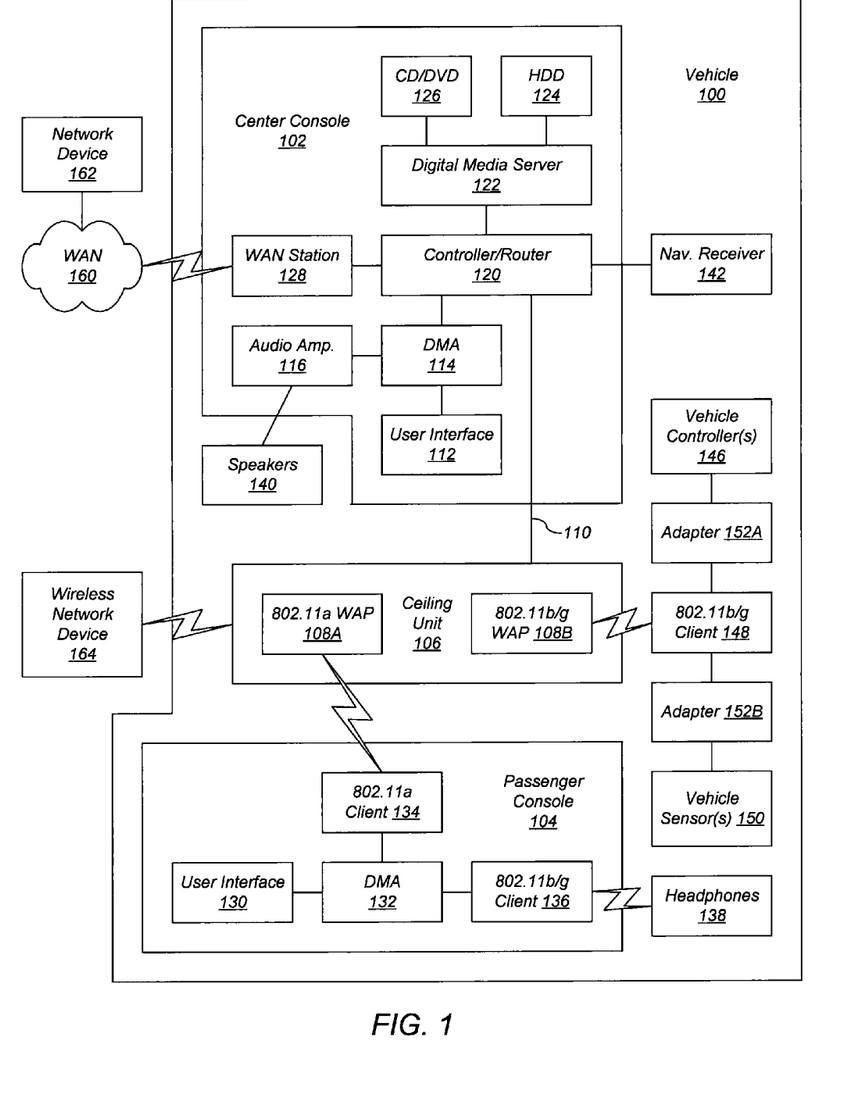
FIG. 1 shows a vehicle comprising one or more wireless networks according to some embodiments of the present invention.

FIG. 1 shows a vehicle 100 comprising one or more wireless networks according to some embodiments of the present invention. Although in the described embodiments, the elements of vehicle 100 are presented in one arrangement, other embodiments may feature other arrangements, as will be apparent to one skilled in the relevant arts based on the disclosure and teachings provided herein. For example, the elements of vehicle 100 can be implemented in hardware, software, or combinations thereof. Furthermore, while in the described embodiment vehicle 100 is an automobile, in other embodiments, vehicle 100 can be implemented as other sorts of vehicles.

Referring to FIG. 1, vehicle 100 includes a center console 102, one or more passenger consoles 104, and a ceiling unit 106. Ceiling unit 106 includes one or more wireless access points (WAP) 108. For example, ceiling unit 106 can include an IEEE 802.11a WAP 108A for wirelessly distributing media to passenger consoles 104, and a IEEE 802.11b/g WAP 108B for wirelessly distributing control signals and wirelessly collecting sensor signals, as described more fully below. WAP(s) 108 can be connected to center console 102 by a cable connection 110 such as a fast Ethernet connection, also as described more fully below. Ceiling unit 106 can be mounted on the ceiling of vehicle 100, or in other locations in vehicle 100, to ensure uniform coverage within vehicle 100. WAP(s) 108 can be secured to prevent interference from outside vehicle 100. WAP(s) 108 can be employed by a user of a wireless network device 164 to communicate with vehicle 100, as described below. Wireless network device 164 can be a computer, PDA, smartphone, key fob, or the like. The connection between network device 162 and WAN 160 can be wired or wireless.

Center console 102 includes a user interface 112, a digital media adapter (DMA) 114, an audio amplifier 116, a controller/router 120, a digital media server 122, a hard disk drive (HDD) 124, and a CD/DVD drive 126. Center console 102 can also include one or more radio receivers for FM radio, satellite radio, and the like. User interface 112 can be implemented as an LCD touch screen or the like. Digital media adapter 114 can be implemented as a CC289 unit, available from C2 Microsystems, or the like. Controller/router 120 can be implemented as separate units or together, for example as a 88F5181 unit, available from Marvell Semiconductor, Inc., or the like. Digital media server 122 can be implemented as an Orion Media Vault 88F5182, available from Marvell Semiconductor, Inc., or the like. HDD 124 and CD/DVD drive 126 can be implemented as conventional units. Center console can also include a wide-area network (WAN) station 128 to communicate with wireless network stations outside vehicle 100. For example, a user of a network device 162 can communicate with vehicle 100 over a WAN 160, as described below. Network device 162 can be a computer, PDA, smartphone, or the like. The connection between network device 162 and WAN 160 can be wired or wireless. WAN station 128 can be implemented as a PC card or the like. WAN station 128 can employ the Evolution-Data Optimized (EVDO) communications standard, the WiMAX (IEEE 802.16e) standard, or the like.

Audio amplifier 116 can be implemented as a conventional automotive audio amplifier or the like, and can deliver audio signals to speakers 140 mounted in vehicle 100. Vehicle 100 can also include a navigation receiver 142 to receive wireless navigation signals such as global positioning system (GPS) signals and the like.

Each passenger console 104 includes a user interface 130, a digital media adapter 132, and a wireless network client 134. Each passenger console 104 can also include a second wireless network client 136 to wirelessly distribute audio to wireless headphones 138. In other embodiments, headphones 138 can be wired headphones with a wired connection to digital media adapter 132. User interface 130 can be implemented as an LCD touch screen or the like. Digital media adapter 132 can be implemented as a CC289 unit, available from C2 Microsystems, or the like. Wireless network client 134 can be implemented as an IEEE 802.11a client or the like. Wireless network client 136 can be implemented as an IEEE 802.11b/g client or the like.

Vehicle 100 can also include one or more vehicle controllers 146 to control vehicle 100 in accordance with packets of data received by one or more wireless network clients 148 from center console 102 or a passenger console 104. Vehicle 100 can also include one or more sensors 150 to generate sensor signals representing conditions of vehicle 100. The sensor signals can be relayed by one or more of wireless network clients 148. One or more adapters 152A,B generate the control signals for vehicle controllers 146 based on packets received by wireless clients 148, and generate packets of data representing the sensor signals generated by sensors 150.

Figure 2:
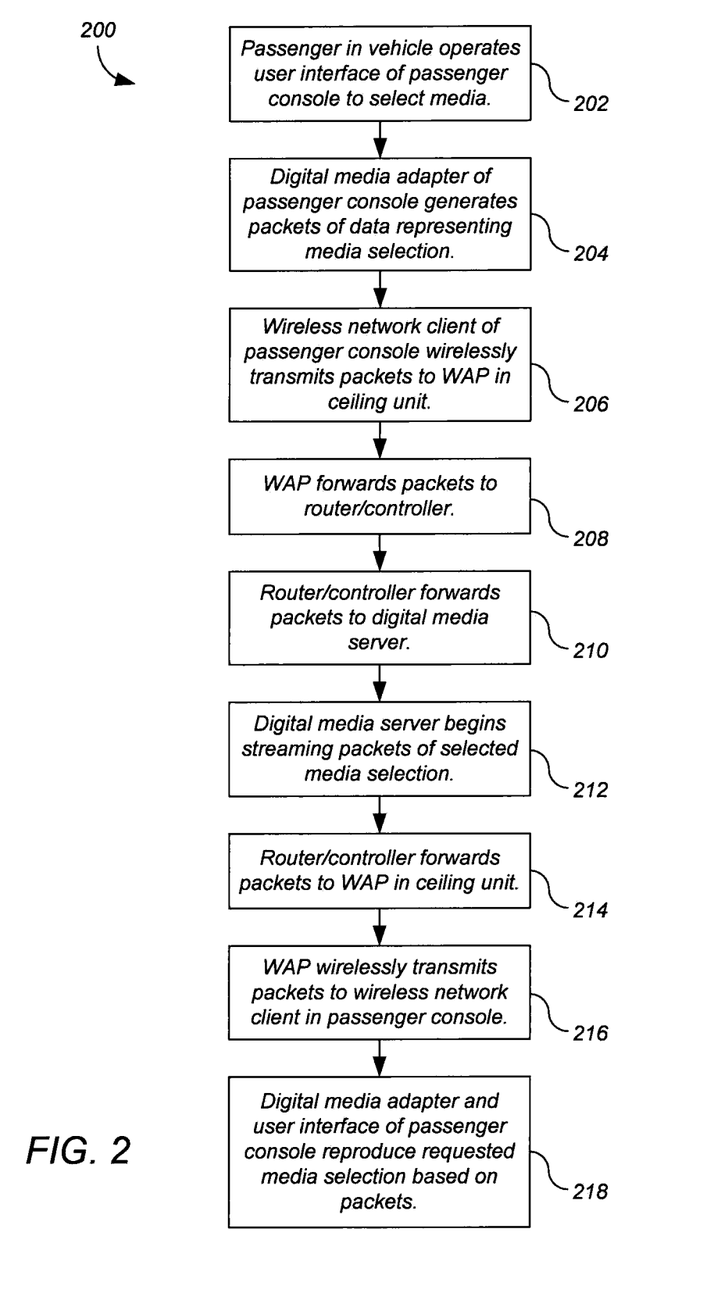
FIG. 2 shows a process for media distribution for the vehicle of FIG. 1 according to some embodiments of the present invention.

FIG. 2 shows a process 200 for media distribution for vehicle 100 of FIG. 1 according to some embodiments of the present invention. Although in the described embodiments, the elements of process 200 are presented in one arrangement, other embodiments may feature other arrangements, as will be apparent to one skilled in the relevant arts based on the disclosure and teachings provided herein. For example, in various embodiments, some or all of the steps of process 200 can be executed in a different order, concurrently, and the like.

A passenger in vehicle 100 operates user interface 130 of passenger console 104 to select media (step 202). For example, user interface 130 displays a number of media selections that can include music, video programs, games, and the like, and the passenger selects one of the media selections using user interface 130. Alternatively, a user can select media using a network device 162 in communication with vehicle 100 over WAN 160 and WAN station 128, or using a wireless network device 164. Digital media adapter 132 of passenger console 104 generates one or more packets of data representing the media selection (step 204). Wireless network client 134 of passenger console 104 wirelessly transmits the packets to WAP 108A in ceiling unit 106 (step 206). For example, wireless network client 134 and WAP 108A establish an IEEE 802.11a infrastructure mode wireless network connection, which is used to transport the packets.

WAP 108A forwards the packets to controller/router 120 (step 208), for example over a fast Ethernet connection. Controller/router 120 forwards the packets to digital media server 122 (step 210). Digital media server 122 provides digital data representing the audio and/or video of the selected media selection. Digital media server 122 begins streaming packets of the selected media selection (step 212), which can be stored on a CD or DVD in CD/DVD drive 126, on HDD 124, or the like. Controller/router 120 forwards the packets to WAP 108A in ceiling unit 106 (step 214), which wirelessly transmits the packets to wireless network client 134 in passenger console 104 (step 216).

Digital media adapter 132 and user interface 130 of passenger console 104 act together as a media player to reproduce the audio and/or video in the requested media selection based on the packets of the digital data (step 218). Digital media adapter 132 provides audio and/or video signals to user interface 130, which presents the media selection to the passenger. For example, the connection between digital media adapter 132 and user interface 130 can include a composite video connection, a USB connection, and the like. In embodiments including wireless headphones 138, digital media adapter 132 provides packets of audio data to wireless network client 136, which wirelessly transmits the packets of audio data to wireless headphones 138. For example, wireless network client 136 and wireless headphones 138 can establish an IEEE 802.11b/g ad hoc mode wireless network connection, which is used to transport the packets. Wireless headphones 138 produce sound in response to the packets of audio data.

Figure 3:
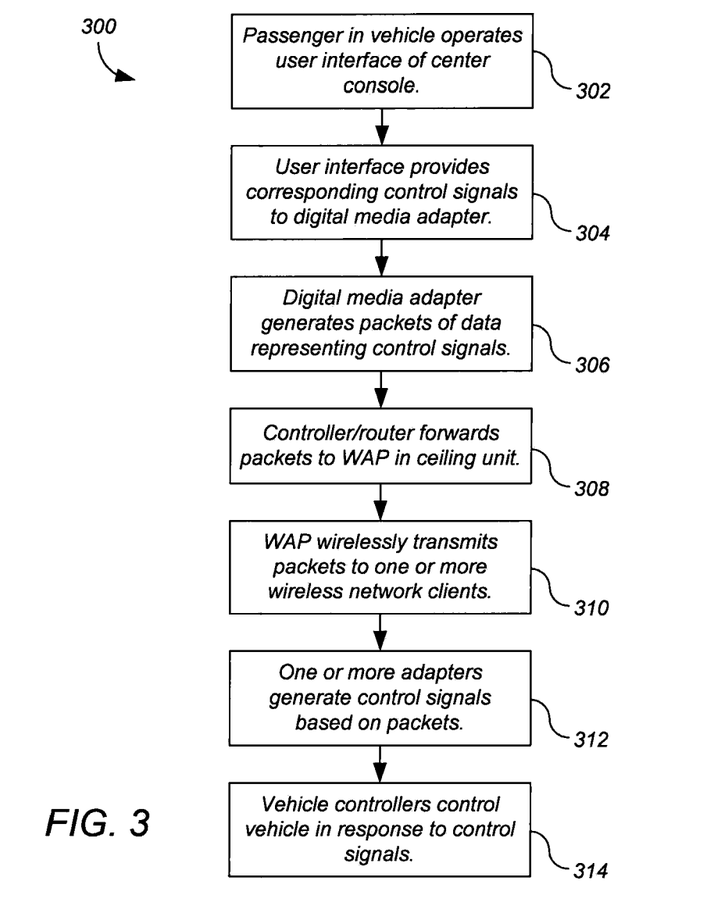
FIG. 3 shows a process for distributing vehicle control signals in the vehicle of FIG. 1 according to some embodiments of the present invention.

FIG. 3 shows a process 300 for distributing vehicle control signals in vehicle 100 of FIG. 1 according to some embodiments of the present invention. Although in the described embodiments, the elements of process 300 are presented in one arrangement, other embodiments may feature other arrangements, as will be apparent to one skilled in the relevant arts based on the disclosure and teachings provided herein. For example, in various embodiments, some or all of the steps of process 300 can be executed in a different order, concurrently, and the like.

A user operates user interface 112 of center console 102 of vehicle 100 to control vehicle 100 (step 302). For example, a user can press a button on user interface 112 to lock a door of vehicle 100. Alternatively, a user can control vehicle 100 using a network device 162 in communication with vehicle 100 over WAN 160 and WAN station 128, or using a wireless network device 164. In response, user interface 112 provides corresponding control signals to digital media adapter 114 (step 304), which generates packets of data representing the control signals (step 306). Controller/router 120 forwards the packets to WAP 108B in ceiling unit 106 (step 308), which wirelessly transmits the packets to one or more wireless network clients 148 (step 310). For example, WAP 108B and wireless network client 148 can establish an IEEE 802.11b/g infrastructure mode wireless network connection, which is used to transport the packets.

One or more adapters 152A generate control signals based on the packets received by wireless network clients 148 (step 312). Vehicle controllers 156 control vehicle 100 in response to the control signals (step 314). In the current example, vehicle controller 146 locks the door of vehicle 100 as requested.

In some embodiments, a user can control vehicle 100 using user interface 130 of a passenger console 104 instead of user interface 112 of center console 102. In these embodiments, packets representing the control signals are passed to controller/router 120 by WAP 108A of ceiling unit 106.

Figure 4:
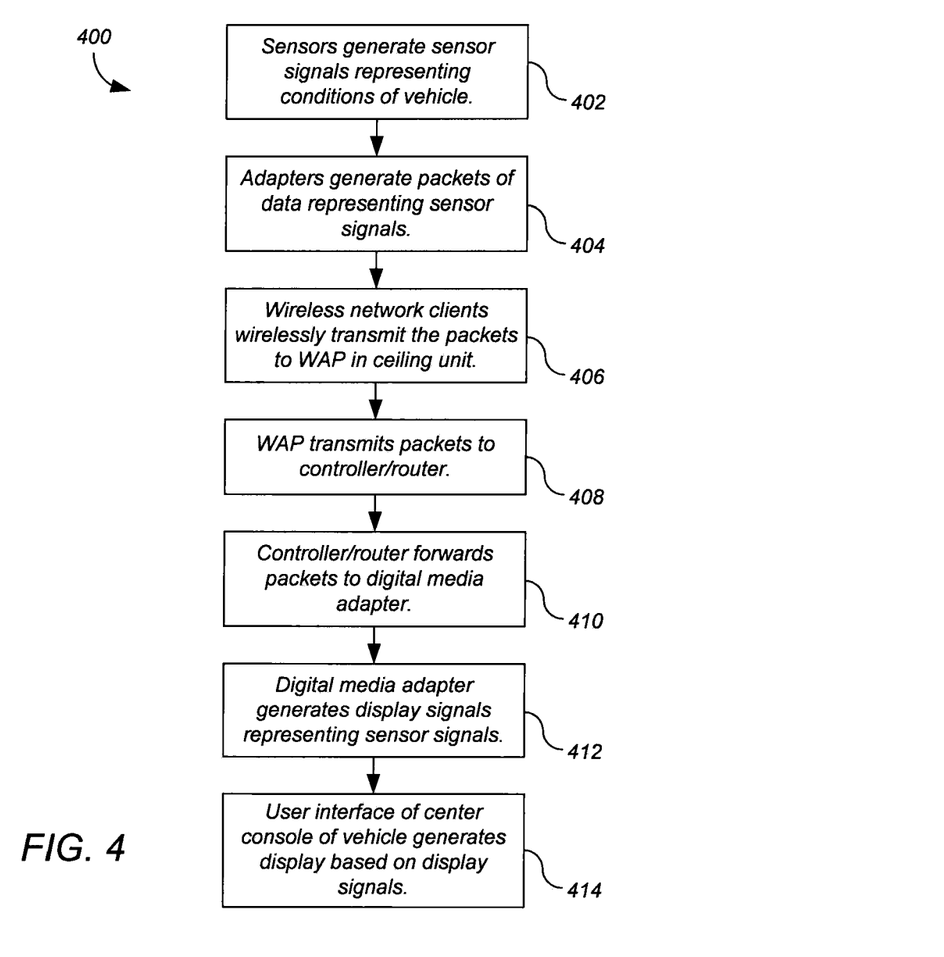
FIG. 4 shows a process for distributing sensor signals in the vehicle of FIG. 1 according to some embodiments of the present invention.

FIG. 4 shows a process 400 for distributing sensor signals in vehicle 100 of FIG. 1 according to some embodiments of the present invention. Although in the described embodiments, the elements of process 400 are presented in one arrangement, other embodiments may feature other arrangements, as will be apparent to one skilled in the relevant arts based on the disclosure and teachings provided herein. For example, in various embodiments, some or all of the steps of process 400 can be executed in a different order, concurrently, and the like.

Sensors 150 generate sensor signals representing conditions of vehicle 100 (step 402). Continuing the above example, a door lock sensor 150 generates sensor signals indicating that the door is now locked. One or more adapters 152B generate packets of data representing the sensor signals (step 404).

Wireless network clients 148 wirelessly transmit the packets to WAP 108B in ceiling unit 106 (step 406), which transmits the packets to controller/router 120 (step 408). For example, WAP 108B and wireless network client 148 can establish an IEEE 802.11b/g infrastructure mode wireless network connection, which is used to transport the packets.

Controller/router 120 forwards the packets to digital media adapter 114 (step 410), which generates display signals representing the sensor signals (step 412). User interface 112 of center console 102 of vehicle 100 generates a display based on the display signals (step 414). Continuing the above example, user interface 112 indicates that the door is now locked. Alternatively, controller/router 120 can forward the packets to a user using a network device 162 in communication with vehicle 100 over WAN 160 and WAN station 128, or using a wireless network device 164.

In some embodiments, packets representing sensor signals can be distributed to a passenger console 104. In these embodiments, the packets are passed to a passenger console 104 by WAP 108B of ceiling unit 106.

Figure 5:
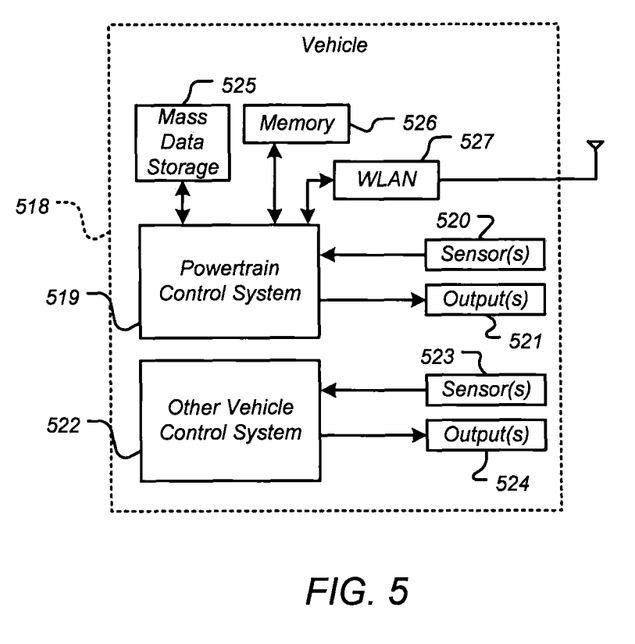
FIG. 5 shows a control system of a vehicle, a WLAN interface and/or mass data storage of the vehicle control system.

Referring now to FIG. 5, the present invention implements a control system of a vehicle 518, a WLAN interface and/or mass data storage of the vehicle control system. In some implementations, the present invention implements a powertrain control system 519 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 522 of the vehicle 518. The control system 522 may likewise receive signals from input sensors 523 and/or output control signals to one or more output devices 524. In some implementations, the control system 522 may be part of an anti-lock braking system (ABS), a navigation system, a telematics system, a vehicle telematics system, a lane departure system, an adaptive cruise control system, a vehicle entertainment system such as a stereo, DVD drive, compact disc system and the like. Still other implementations are contemplated.

The powertrain control system 519 may communicate with mass data storage 525 that stores data in a nonvolatile manner. The mass data storage 525 may include optical and/or magnetic storage devices including HDDs and/or DVD drives. The HDD may be a mini HDD that includes one or more platters having a diameter that is smaller than approximately 1.8". The powertrain control system 519 may be connected to memory 526 such as RAM, ROM, low latency nonvolatile memory such as flash memory and/or other suitable electronic data storage. The powertrain control system 519 also may support connections with a WLAN via a WLAN network interface 527. The control system 522 may also include mass data storage, memory and/or a WLAN interface (all not shown).

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A system for controlling an operation of a vehicle, the system comprising:
    a first wireless client station configured to be implemented in the vehicle, wherein the first client station is compliant with an 802.11 standard set forth by the Institute of Electrical and Electronics Engineers (IEEE), wherein the first wireless client station is configured to transmit a first packet, wherein the first packet includes a first command to control the operation of the vehicle;
    a controller configured to be implemented in the vehicle; and
    a wireless access point configured to be implemented in the vehicle, wherein the wireless access point is compliant with an 802.11 standard set forth by the Institute of Electrical and Electronics Engineers (IEEE), and wherein the wireless access point is configured to
        receive the first packet transmitted from the first wireless client station, and
        subsequent to receiving the first packet transmitted from the first wireless client station, transmit the first packet to the controller;
    wherein in response to the controller receiving the first packet transmitted from the wireless access point, the controller is configured to control the operation of the vehicle in accordance with the first command included within the first packet,
    wherein the wireless access point is configured to (i) receive a second packet from a second wireless client station external to the vehicle, wherein the second client station is compliant with an 802.11 standard set forth by the Institute of Electrical and Electronics Engineers (IEEE), and wherein the second packet includes a second command to control the operation of the vehicle, and (ii) transmit the second packet; and
    wherein the controller is configured to:
        receive the second packet from the wireless access point, and
        control the operation of the vehicle in accordance with the second command included within the second packet.

2. A system for controlling an operation of a vehicle, the system comprising:
    a first wireless client station configured to be implemented in the vehicle, wherein the first wireless client station is configured to transmit a first packet, wherein the first packet includes a first command to control the operation of the vehicle;
    a controller configured to be implemented in the vehicle; and
    a wireless access point configured to be implemented in the vehicle, wherein the wireless access point is configured to
        receive the first packet transmitted from the first wireless client station, and
        subsequent to receiving the first packet transmitted from the first wireless client station, transmit the first packet to the controller;
    wherein in response to the controller receiving the first packet transmitted from the wireless access point, the controller is configured to control the operation of the vehicle in accordance with the first command included within the first packet;
    wherein the first wireless client station is configured to transmit a second packet including a second command;
    wherein the wireless access point is configured to
        receive and transmit the second packet;
        receive, in response to transmitting the second packet, one or more packets from a server implemented in the vehicle, wherein the one or more packets include data in accordance with the second command included within the second packet; and
        transmit the one or more packets; and
    wherein the first wireless client station is configured to
        receive the one or more packets from the wireless access point, and
        transmit the one or more packets to a media player implemented in the vehicle to generate an output on the media player in accordance with the data included within the one or more packets.

3. The system of claim 2, further comprising a user interface configured to be implemented in the vehicle, wherein the user interface is configured to (i) receive an input from a person in the vehicle, and (ii) generate the first packet in accordance with the input.

4. The system of claim 2, further comprising a user interface configured to be implemented in the vehicle, wherein the user interface is configured to (i) receive an input from a person in the vehicle, and (ii) generate the second packet in accordance with the input.

5. The system of claim 2, further comprising:
    a sensor configured to be implemented in the vehicle, wherein the sensor is configured to sense a condition of the vehicle; and
    a second wireless client station configured to be implemented in the vehicle, wherein the second wireless client station is configured to transmit a second packet to the wireless access point, and wherein the second packet includes data indicating the condition sensed by the sensor.

6. The system of claim 5, further comprising a user interface configured to be implemented in the vehicle, wherein the user interface is configured to (i) receive the second packet from the wireless access point, and (ii) generate an indication of the condition in accordance with the data included within the second packet.

7. The system of claim 2, wherein the wireless access point is configured to (i) receive a second packet from a wireless device external to the vehicle, wherein the second packet includes a second command to control the operation of the vehicle, and (ii) transmit the second packet.

8. The system of claim 7, wherein the controller is configured to:
    receive the second packet from the wireless access point, and
    control the operation of the vehicle in accordance with the second command included within the second packet.

9. A method for controlling an operation of a vehicle, the method comprising:
    transmitting a first packet from a first wireless client station, wherein the first client station is compliant with an 802.11 standard set forth by the Institute of Electrical and Electronics Engineers (IEEE), wherein the first packet includes a first command to control the operation of the vehicle, and wherein the first wireless client station is implemented in the vehicle;
    receiving, at an access point implemented in the vehicle, the first packet transmitted by the first wireless client station, wherein the access point is compliant with an 802.11 standard set forth by the Institute of Electrical and Electronics Engineers (IEEE), and wherein the access point is implemented in the vehicle;

forwarding, from the access point, the first packet to a controller, wherein the controller is implemented in the vehicle;

controlling, using the controller, the operation of the vehicle in accordance with the first command included within the first packet;

receiving, at the access point, a second packet from a second wireless client station external to the vehicle, wherein the second client station is compliant with an 802.11 standard set forth by the Institute of Electrical and Electronics Engineers (IEEE), and wherein the second packet includes a second command to control the operation of the vehicle;

forwarding, from the access point, the second packet to the controller; and controlling, using the controller, the operation of the vehicle in accordance with the second command included within the second packet.

10. A method for controlling an operation of a vehicle, the method comprising:

transmitting a first packet from a first wireless client station, wherein the first packet includes a first command to control the operation of the vehicle, and wherein the first wireless client station is implemented in the vehicle;

receiving, at an access point implemented in the vehicle, the first packet transmitted by the first wireless client station, wherein the access point is implemented in the vehicle;

forwarding, from the access point, the first packet to a controller, wherein the controller is implemented in the vehicle;

controlling, using the controller, the operation of the vehicle in accordance with the first command included within the first packet;

transmitting, from the first wireless client station, a second packet including a second command;

forwarding the second packet to a server implemented in the vehicle;

forwarding one or more packets from the server to the first wireless client station, wherein the one or more packets include data according to the second command;

transmitting the one or more packets from the first wireless client station; and generating an output on a media player implemented in the vehicle in accordance with the data included within the one or more packets.

11. The method of claim 10, further comprising generating the first packet in accordance with an input received from a person in the vehicle.

12. The method of claim 10, further comprising generating the second packet in accordance with an input received from a person in the vehicle.

13. The method of claim 10, further comprising:

sensing a condition of the vehicle; and transmitting a second packet from a second wireless client station implemented in the vehicle, wherein the second packet includes data indicating the condition of the vehicle.

14. The method of claim 13, further comprising generating an indication of the condition in accordance with the data included in the second packet.

15. The method of claim 10, further comprising:

receiving a second packet from a wireless device external to the vehicle, wherein the second packet includes a second command to control the operation of the vehicle; and forwarding the second packet to the controller.

16. The method of claim 15, further comprising controlling, using the controller, the operation of the vehicle in accordance with the second command included within the second packet.

* * * * *